US011990701B2

(12) United States Patent
Baek et al.

(10) Patent No.: US 11,990,701 B2
(45) Date of Patent: May 21, 2024

(54) RECEPTACLE CONNECTOR INCLUDING ELECTROMAGNETIC COMPATIBILITY (EMC) SHIELD

(71) Applicant: SAMSUNG ELECTRONICS CO., LTD., Suwon-si (KR)

(72) Inventors: Seon Gyun Baek, Suwon-si (KR); Jae Hong Park, Suwon-si (KR); Yusuf Cinar, Yongin-si (KR); Han Hong Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 51 days.

(21) Appl. No.: 17/743,197

(22) Filed: May 12, 2022

(65) Prior Publication Data

US 2022/0278475 A1 Sep. 1, 2022

Related U.S. Application Data

(63) Continuation of application No. 16/822,872, filed on Mar. 18, 2020, now Pat. No. 11,495,907.

(30) Foreign Application Priority Data

Jul. 3, 2019 (KR) ........................ 10-2019-0080067
Oct. 15, 2019 (KR) ........................ 10-2019-0127562

(51) Int. Cl.
*H01R 13/50* (2006.01)
*H01R 13/40* (2006.01)
(Continued)

(52) U.S. Cl.
CPC ............. *H01R 13/50* (2013.01); *H01R 13/40* (2013.01); *H01R 13/405* (2013.01);
(Continued)

(58) Field of Classification Search
CPC ...... H01R 13/50; H01R 13/40; H01R 13/405; H01R 13/6581; H01R 13/6585;
(Continued)

(56) References Cited

U.S. PATENT DOCUMENTS 7,500,861 B2 3/2009 Harkabi et al.
9,281,643 B1 3/2016 Tseng
(Continued)

FOREIGN PATENT DOCUMENTS

KR 10-1423286 B1 7/2014
KR 10-1821298 B1 1/2018

*Primary Examiner* — Abdullah A Riyami
*Assistant Examiner* — Justin M Kratt
(74) *Attorney, Agent, or Firm* — Sughrue Mion, PLLC

(57) ABSTRACT

Provided are a receptacle connector configured to avoid damage to conductors of the receptacle connector. The receptacle connector includes a plurality of connection terminals, a mold structure which comprises a front part exposing each of the connection terminals and a support part disposed on a rear end of the front part and surrounding each of the connection terminals, and a shield which is disposed on the support part and comprises a conductive material, wherein the support part comprises a flat part which includes a surface along which the shield extends and a protruding part which protrudes from the surface of the flat part and is disposed in front of a front end of the shield. The protruding part is configured to avoid damage to conductors of the receptacle when a plug is mated to the receptacle.

21 Claims, 17 Drawing Sheets

(51) Int. Cl.

| | |
|---|---|
| ***H01R 13/405*** | (2006.01) |
| ***H01R 13/6581*** | (2011.01) |
| ***H01R 13/6585*** | (2011.01) |
| *H01R 12/51* | (2011.01) |
| *H01R 13/502* | (2006.01) |
| *H01R 13/504* | (2006.01) |
| *H01R 13/6582* | (2011.01) |
| *H01R 13/6583* | (2011.01) |
| *H01R 13/6586* | (2011.01) |
| *H01R 13/6587* | (2011.01) |
| *H01R 24/60* | (2011.01) |

(52) U.S. Cl.
CPC ..... *H01R 13/6581* (2013.01); *H01R 13/6585* (2013.01); *H01R 12/51* (2013.01); *H01R 13/502* (2013.01); *H01R 13/504* (2013.01); *H01R 13/6582* (2013.01); *H01R 13/6583* (2013.01); *H01R 13/6586* (2013.01); *H01R 13/6587* (2013.01); *H01R 24/60* (2013.01); *H01R 2201/06* (2013.01)

(58) Field of Classification Search
CPC .... H01R 12/51; H01R 13/502; H01R 13/504; H01R 13/6582; H01R 13/6583; H01R 13/6586; H01R 13/6587; H01R 24/60; H01R 2201/06
See application file for complete search history.

(56) References Cited

U.S. PATENT DOCUMENTS

| | | | | |
|---|---|---|---|---|
| 9,780,505 | B2 | 10/2017 | Peng et al. | |
| 10,283,915 | B2 | 5/2019 | Han et al. | |
| 2016/0064870 | A1 | 3/2016 | Yu | |
| 2017/0033511 | A1 | 2/2017 | Hsu | |
| 2017/0194745 | A1* | 7/2017 | Tsai | H01R 13/6594 |
| 2017/0310056 | A1* | 10/2017 | Yuan | H01R 13/6585 |
| 2018/0323563 | A1 | 11/2018 | Xu | |
| 2019/0103697 | A1 | 4/2019 | Amini et al. | |
| 2019/0103701 | A1 | 4/2019 | Degner et al. | |
| 2019/0109421 | A1 | 4/2019 | Gao et al. | |

* cited by examiner

FIG. 8

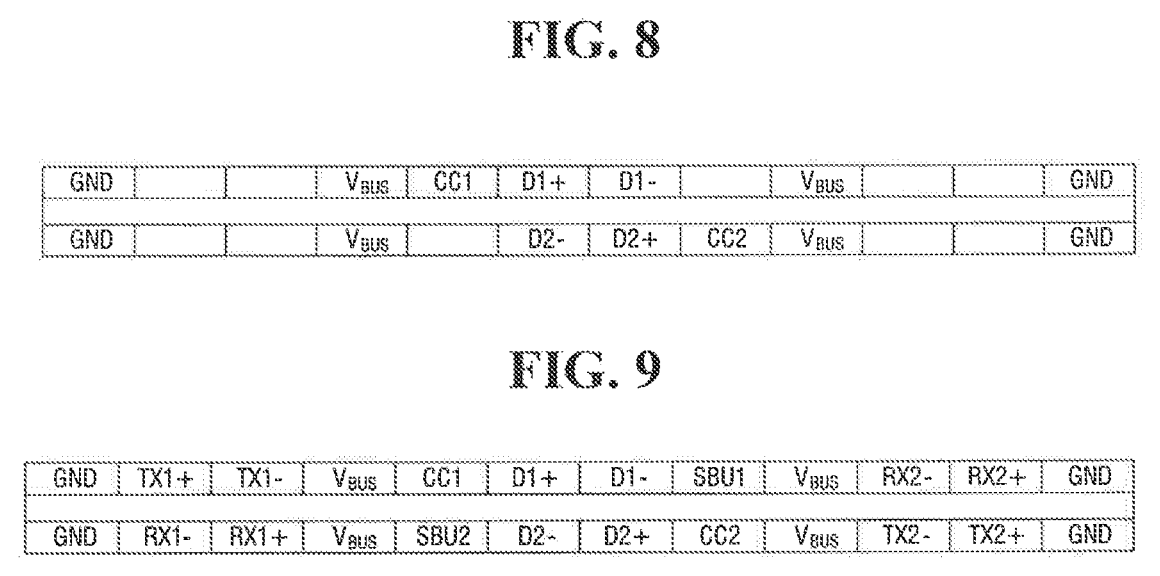

| | | | | | | | | | | | |
|---|---|---|---|---|---|---|---|---|---|---|---|
| GND | | | $V_{BUS}$ | CC1 | D1+ | D1- | | $V_{BUS}$ | | | GND |
| GND | | | $V_{BUS}$ | | D2- | D2+ | CC2 | $V_{BUS}$ | | | GND |

FIG. 9

| | | | | | | | | | | | |
|---|---|---|---|---|---|---|---|---|---|---|---|
| GND | TX1+ | TX1- | $V_{BUS}$ | CC1 | D1+ | D1- | SBU1 | $V_{BUS}$ | RX2- | RX2+ | GND |
| GND | RX1- | RX1+ | $V_{BUS}$ | SBU2 | D2- | D2+ | CC2 | $V_{BUS}$ | TX2- | TX2+ | GND |

RECEPTACLE CONNECTOR INCLUDING ELECTROMAGNETIC COMPATIBILITY (EMC) SHIELD

This application is a Continuation Application of U.S. application Ser. No. 16/822,872 filed on Mar. 18, 2020, which claims the benefit of Korean Patent Application No. 10-2019-0080067, filed on Jul. 3, 2019, in the Korean Intellectual Property Office, and Korean Patent Application No. 10-2019-0127562, filed on Oct. 15, 2019, in the Korean Intellectual Property Office; all of the above are incorporated by reference herein in their entirety.

BACKGROUND

1. Technical Field

The present disclosure relates to a receptacle connector, and more particularly, to a receptacle connector including an electromagnetic compatibility (EMC) shield.

2. Description of the Related Art

Generally, connectors may include a plug connector and a receptacle connector. The receptacle connector is mounted on a printed circuit board (PCB) or the like of an electronic device and coupled to the plug connector. The receptacle connector may include a plurality of connection terminals, a mold structure supporting the connection terminals, and a housing surrounding the mold structure.

The connection terminals may be arranged in a form that satisfies, for example, a universal serial bus (USB) pin standard. The connection terminals may be held in the mold structure while being insulated from each other by the mold structure and may be shielded from the outside by the housing surrounding the mold structure.

SUMMARY

Aspects of the present disclosure provide a receptacle connector with reinforced strength.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Provided herein is a receptacle connector including: a plurality of connection terminals; a mold structure including: a front part configured to expose each of the plurality of connection terminals, and a support part disposed on a rear end of the front part and configured to surround each of the plurality of connection terminals; and a shield, wherein the shield is disposed on the support part and includes a conductive material, wherein the support part includes: a flat part, wherein the flat part includes a surface along which the shield extends, and a protruding part, wherein the protruding part protrudes from the surface of the flat part and is disposed in front of a front end of the shield.

Also provided herein is another receptacle connector, configured to be coupled to a plug connector inserted in a first direction, the receptacle connector including: a plurality of first connection terminals, wherein the plurality of first connection terminals extend in the first direction; a mold structure which includes: a front part, wherein the front part is configured to expose each of the plurality of first connection terminals, and a support part disposed on a rear end of the front part and configured to surround each of the plurality of first connection terminals; and a shield, wherein the shield is disposed on the support part and configured to be grounded, wherein the support part includes a flat part, wherein the flat part includes: a surface along which the shield extends, and a protruding part, wherein the protruding part protrudes from the surface of the flat part, and the protruding part overlaps at least a part of a front end of the shield in the first direction.

Yet also provided is another receptacle connector including: a plurality of connection terminals, wherein the plurality of connection terminals are arranged in a form compliant with a USB type-C pin standard; a mold structure, wherein the mold structure includes: a front part exposing each of the plurality of connection terminals, a support part disposed on a rear end of the front part and configured to surround each of the plurality of connection terminals, and a rear part disposed on a rear end of the support part and protruding further than an upper surface of the support part; a shield, wherein the shield includes: a first horizontal part extending along the upper surface of the support part, a bent part bent from the first horizontal part and extending along a front surface of the rear part, and a second horizontal part, wherein the second horizontal part is bent from the bent part and extending along an upper surface of the rear part; and a housing, wherein the housing surrounds the mold structure and is in contact with the second horizontal part, wherein the support part includes: a flat part, wherein the flat part includes a surface along which the first horizontal part extends, and a protruding part, wherein the protruding part protrudes from an upper surface of the flat part and the protruding part is disposed in front of a front end of the first horizontal part.

In addition, provided herein is a receptacle connector including: a contact means configured to permit electrical contact to second contacts of a plug and allow passage of electrical signals between the contact means and the second contacts; a first ground pad means configured to provide electromagnetic shielding of the electrical signals in a proximity of the receptacle connector; a flat means configured to physically support the first ground pad means; a protruding means coupled to the flat means, wherein the protruding means is configured to momentarily deflect a second ground pad of the plug in order to avoid a collision and buckling of the first ground pad during an engagement of the plug to the receptacle connector; and a receptacle housing means configured to structurally hold in physical relation to each other the flat means, the first ground pad means and the contact means. According to an aspect of the present disclosure, there is provided a receptacle connector comprising a plurality of connection terminals, a mold structure which comprises a front part exposing each of the connection terminals and a support part disposed on a rear end of the front part and surrounding each of the connection terminals, and a shield which is disposed on the support part and comprises a conductive material, wherein the support part comprises a flat part which includes a surface along which the shield extends and a protruding part which protrudes from the surface of the flat part and is disposed in front of a front end of the shield.

According to another aspect of the present disclosure, there is provided a receptacle connector to be coupled to a plug connector inserted in a first direction, the receptacle connector comprising a plurality of first connection terminals which extend in the first direction, a mold structure which comprises a front part exposing each of the first connection terminals and a support part disposed on a rear end of the front part and surrounding each of the first connection terminals, and a shield which is disposed on the support part and grounded, wherein the support part comprises a flat part which includes a surface along which the shield extends and a protruding part which protrudes from the surface of the flat part, and the protruding part overlaps at least a part of a front end of the shield in the first direction.

According to still another aspect of the present disclosure, there is provided a receptacle connector comprising a plurality of connection terminals which are arranged in a form that satisfies a USB type-C pin standard, a mold structure which comprises a front part exposing each of the connection terminals, a support part disposed on a rear end of the front part and surrounding each of the connection terminals, and a rear part disposed on a rear end of the support part and protruding further than an upper surface of the support part, a shield which comprises a first horizontal part extending along the upper surface of the support part, a bent part bent from the first horizontal part and extending along a front surface of the rear part, and a second horizontal part bent from the bent part and extending along an upper surface of the rear part, and a housing which surrounds the mold structure and contacts the second horizontal part of the shield, wherein the support part comprises a flat part which includes a surface along which the first horizontal part extends and a protruding part which protrudes from an upper surface of the flat part and is disposed in front of a front end of the first horizontal part.

BRIEF DESCRIPTION OF THE DRAWINGS

These and/or other aspects will become apparent and more readily appreciated from the following description of the embodiments, taken in conjunction with the accompanying drawings in which:

FIG. 8 illustrates the arrangement of connection terminals of the receptacle connector according to the embodiments.

FIG. 9 illustrates the arrangement of connection terminals of the receptacle connector according to the embodiments.

DETAILED DESCRIPTION

Receptacle connectors according to embodiments will now be described with reference to FIGS. 1 through 18.

Figure 1:
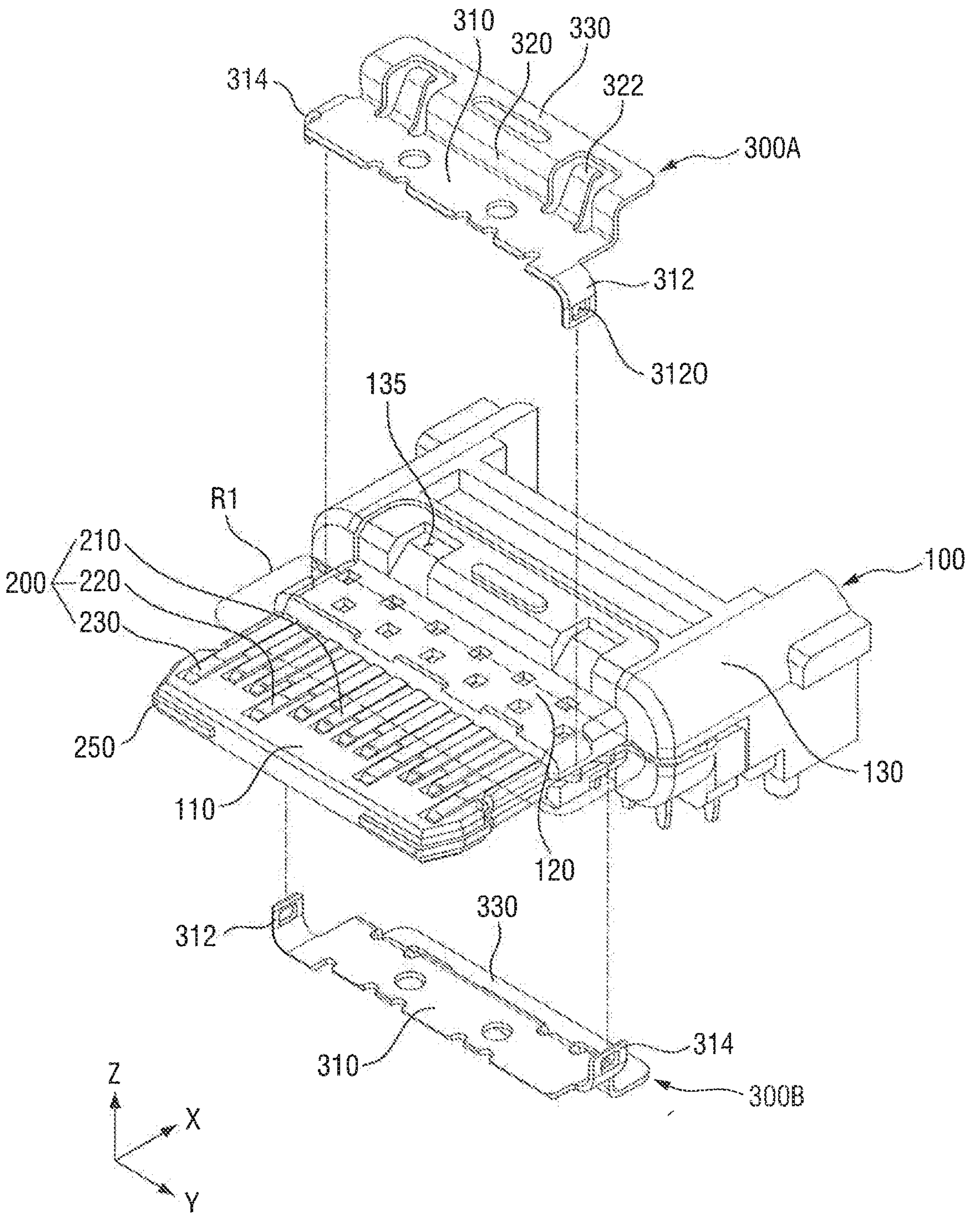
FIG. 1 is an exploded perspective view of a receptacle connector according to embodiments.
Figure 2:
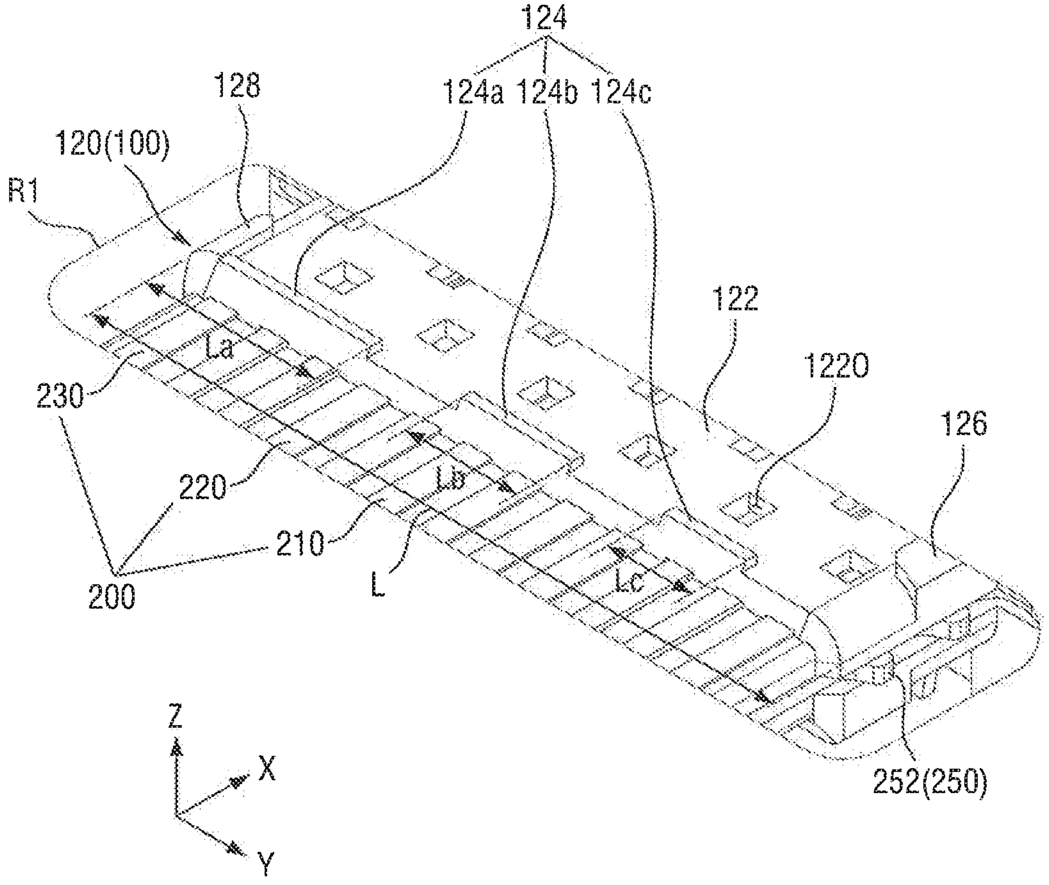
FIG. 2 is an enlarged view of region R1 of FIG. 1.
Figure 3:
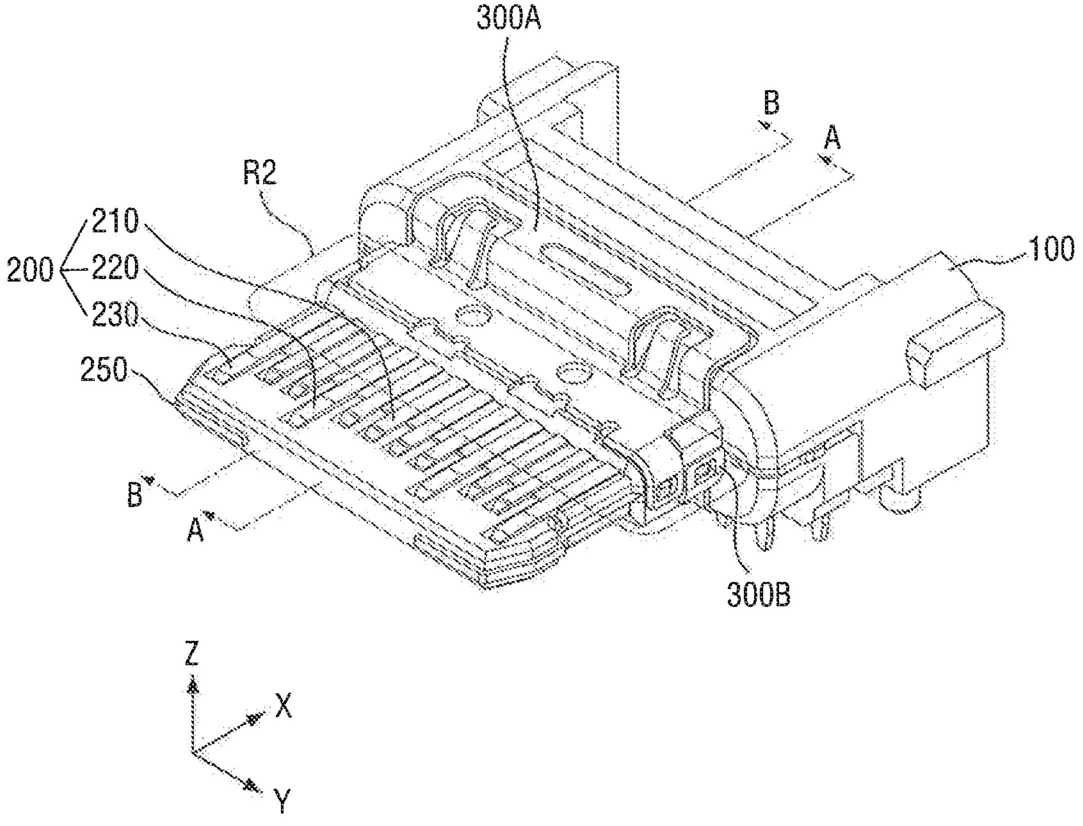
FIG. 3 is a perspective view of the receptacle connector according to the embodiments.
Figure 4:
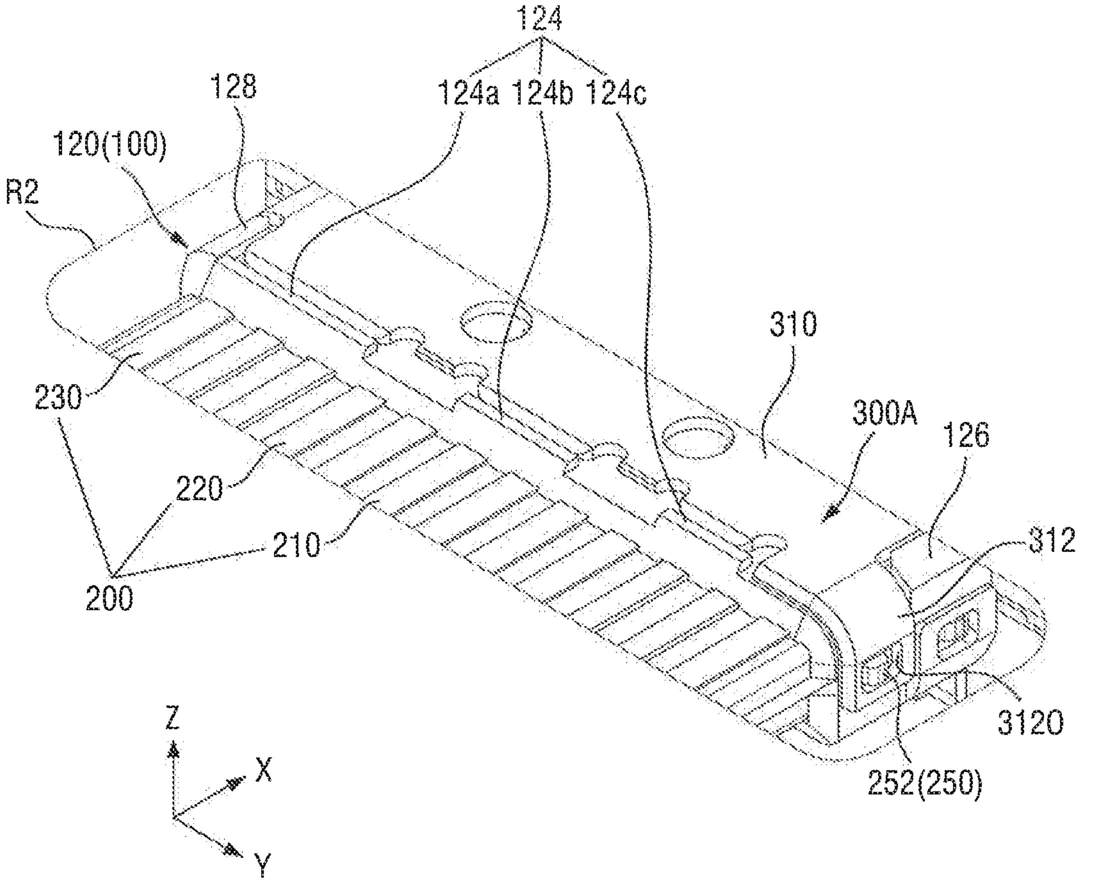
FIG. 4 is an enlarged view of region R2 of FIG. 3.
Figure 5:
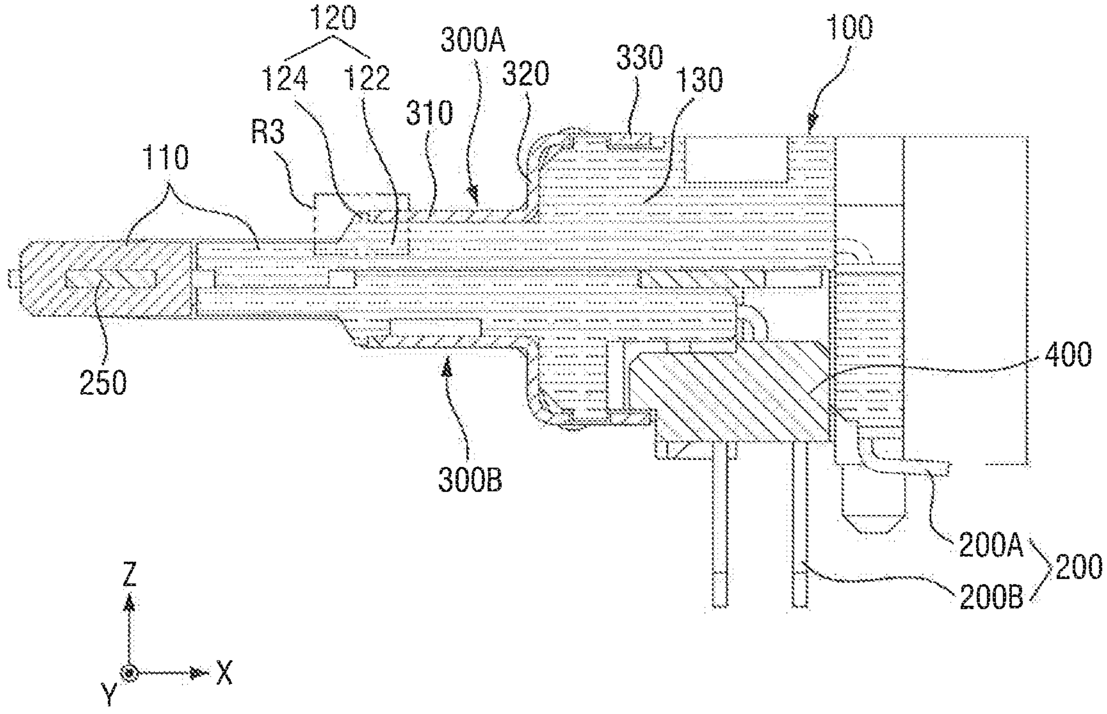
FIG. 5 is a cross-sectional view taken along line A-A of FIG. 3.
Figure 6:
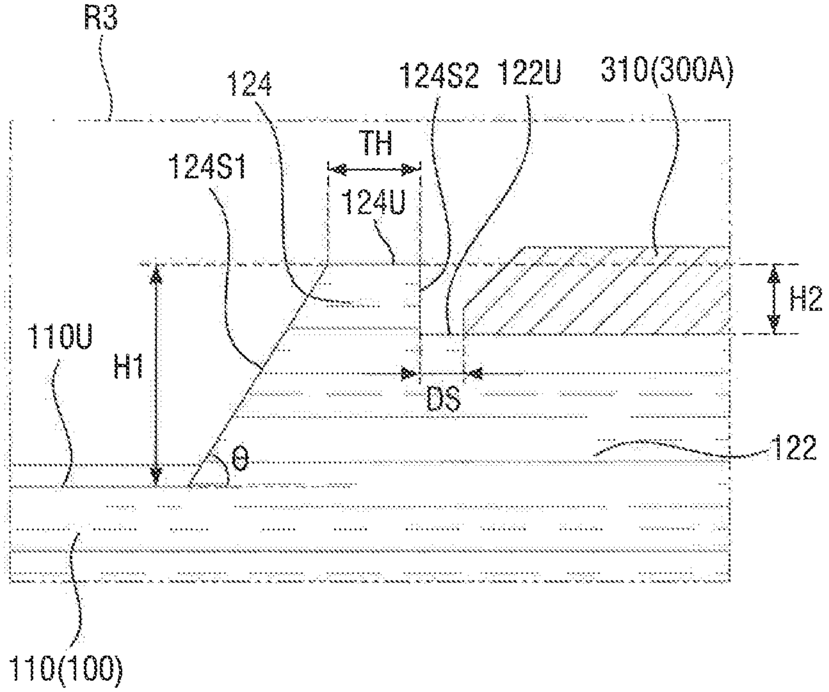
FIG. 6 is an enlarged view of region R3 of FIG. 5.
Figure 7:
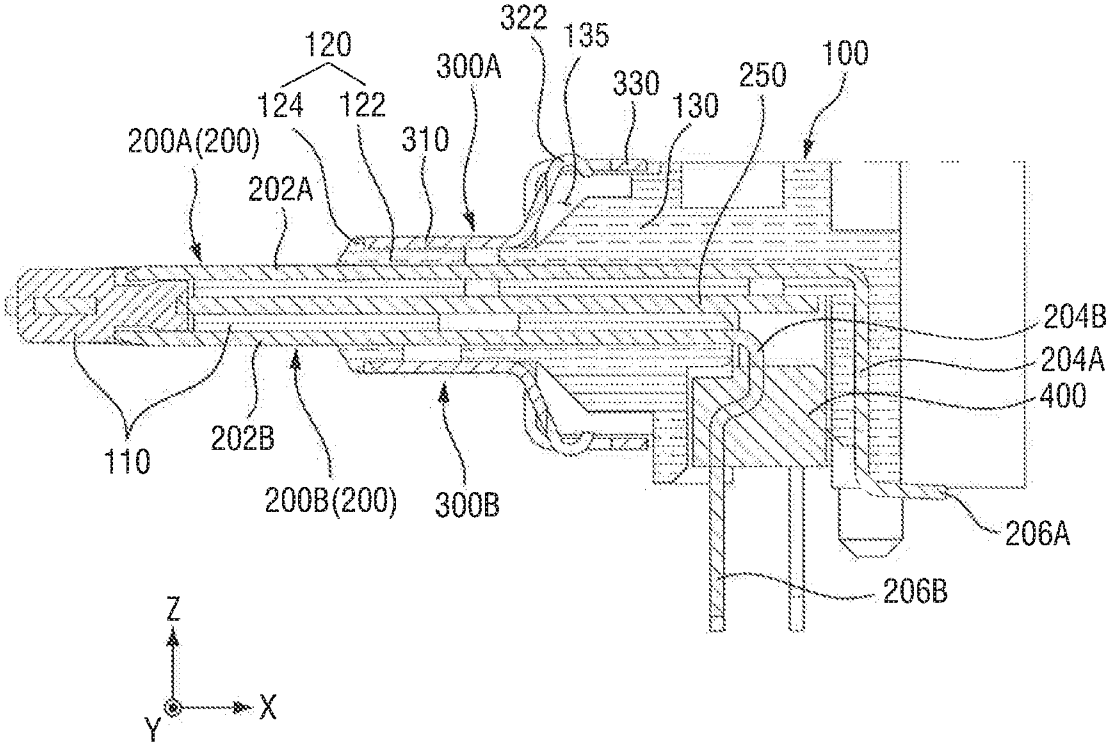
FIG. 7 is a cross-sectional view taken along line B-B of FIG. 3.

FIG. 1 is an exploded perspective view of a receptacle connector according to embodiments. FIG. 2 is an enlarged view of region R1 of FIG. 1. FIG. 3 is a perspective view of the receptacle connector according to the embodiments. FIG. 4 is an enlarged view of region R2 of FIG. 3. FIG. 5 is a cross-sectional view taken along line A-A of FIG. 3. FIG. 6 is an enlarged view of region R3 of FIG. 5. FIG. 7 is a cross-sectional view taken along line B-B of FIG. 3. FIG. 8 illustrates the arrangement of connection terminals of the receptacle connector according to the embodiments. FIG. 9 illustrates the arrangement of connection terminals of the receptacle connector according to the embodiments.

Referring to FIGS. 1 through 9, the receptacle connector according to the embodiments includes a mold structure 100, a plurality of first connection terminals 200, and shields 300A and 300B.

The receptacle connector according to the embodiments may be mounted on a substrate (e.g., a printed circuit board (PCB)) or the like. In addition, the receptacle connector according to the embodiments may be coupled to a corresponding plug connector (e.g., a plug connector 500 of FIG. 10). For example, the plug connector may advance along a first direction X to be coupled to the receptacle connector according to the embodiments.

A front of a receptacle connector, as used herein, denotes a direction from the receptacle connector toward a corresponding plug connector when the receptacle connector is coupled to the plug connector. Conversely, a rear of the receptacle connector, as used herein, denotes a direction opposite to the front of the receptacle connector.

In addition, a front end of the receptacle connector, as used herein, denotes an end of the receptacle disposed at the front of the receptacle connector. Conversely, a rear end of the receptacle connector, as used herein, denotes an end of the receptacle connector disposed at the rear of the receptacle connector.

The first connection terminals 200 may be disposed in the mold structure 100. For example, the first connection terminals 200 may be supported and fixed by the mold structure 100. In some embodiments, the mold structure 100 may include a front part 110 (a first portion of mold structure 100), a support part 120 (a second portion of mold structure 100), and a rear part 130.

The front part 110 of the mold structure 100 may be plate-shaped. For example, the front part 110 may be shaped like a plate extending in the first direction and a second direction Y intersecting the first direction X. In addition, the front part 110 may expose a part of each of the first connection terminals 200. Accordingly, when the receptacle connector according to the embodiments is coupled to a corresponding plug connector (e.g., the plug connector 500 of FIG. 10), the first connection terminals 200 may be electrically connected to connection terminals (e.g., second connection terminals 600 of FIG. 10) of the plug connector, respectively.

The support part 120 of the mold structure 100 may be disposed on a rear end of the front part 110. In addition, the support part 120 may cover the other part of each of the first connection terminals 200. Accordingly, the first connection terminals 200 may be supported and fixed by the mold structure 100.

In some embodiments, the support part 120 may be thicker than the front part 110. For example, in a third direction Z intersecting the first direction X and the second direction Y, a thickness of the support part 120 may be greater than that of the front part 110. For example, as illustrated in FIGS. 5 and 7, the support part 120 may protrude further than an upper surface of the front part 110 and a lower surface of the front part 110.

The rear part 130 of the mold structure 100 may be disposed on a rear end of the support part 120. The rear part 130 of the mold structure 100 may be disposed on a substrate (not illustrated) on which the receptacle connector according to the embodiments is mounted.

In some embodiments, the rear part 130 may be thicker than the support part 120. For example, in the third direction Z, a thickness of the rear part 130 may be greater than that of the support part 120. For example, as illustrated in FIGS. 5 and 7, the rear part 130 may protrude further than an upper surface of the support part 120 and/or a lower surface of the support part 120.

The mold structure 100 may be made of an insulating material such as a polymer or a plastic resin. Accordingly, the mold structure 100 may electrically insulate the first connection terminals 200 from each other. In some embodiments, the mold structure 100 may include a liquid crystal polymer (LCP).

The support part 120 of the mold structure 100 may include a flat part 122 and a first protruding part 124. The first protruding part 124 may protrude from the flat part 122. For example, as illustrated in FIG. 2, the support part 120 may include the flat part 122 extending in the first direction X and the second direction Y. Here, the first protruding part 124 may protrude in the third direction Z from a surface of the flat part 122.

In some embodiments, the flat part 122 of the support part 120 may include a plurality of first openings 1220. Each of the first openings 1220 may extend, for example, in the third direction Z and may be exposed from the surface of the flat part 122.

In some embodiments, the first protruding part 124 may protrude from a front end of the flat part 122. For example, the first protruding part 124 may protrude in the third direction Z from a part of the flat part 122 which is adjacent to the front part 110.

In some embodiments, as illustrated in FIG. 6, the first protruding part 124 may include a front surface 124S1, a rear surface 124S2, and an upper surface 124U.

The front surface 124S1 of the first protruding part 124 may face the front of the receptacle connector according to the embodiments. In addition, the front surface 124S1 of the first protruding part 124 may connect the upper surface 110U of the front part 110 and the upper surface 124U of the first protruding part 124.

The rear surface 124S2 of the first protruding part 124 may face the rear of the receptacle connector according to the embodiments. That is, the rear surface 124S2 of the first protruding part 124 may be opposite the front surface 124S1 of the first protruding part 124. In addition, the rear surface 124S2 of the first protruding part 124 may connect an upper surface 122U of the flat part 122 and the upper surface 124U of the first protruding part 124. The rear surface 124S2 of the first protruding part 124 may face a front end of each of the shields 300A and 300B to be described later.

The upper surface 124U of the first protruding part 124 may connect the front surface 124S1 of the first protruding part 124 and the rear surface 124S2 of the first protruding part 124. For example, the upper surface 124U of the first protruding part 124 may intersect the third direction Z.

In some embodiments, a height to which the first protruding part 124 protrudes from the surface of the flat part 122 may be about 0.03 mm to about 0.13 mm. "mm" stands for "millimeter." For example, a height H2 of the upper surface 124U of the first protruding part 124 from the upper surface 122U of the flat part 122 may be about 0.03 mm to about 0.13 mm.

In some embodiments, a length of the front surface 124S1 of the first protruding part 124 may be greater than a length of the rear surface 124S2 of the first protruding part 124. For example, a height H1 of the upper surface 124U of the first protruding part 124 from the upper surface 110U of the front part 110 may be greater than the height H2 of the upper surface 124U of the first protruding part 124 from the upper surface 122U of the flat part 122.

In some embodiments, the front surface 124S1 of the first protruding part 124 may be at an angle to the upper surface 110U of the front part 110. In some embodiments, an inclination angle θ formed by the front surface 124S1 of the first protruding part 124 with the upper surface 110U of the front part 110 may be about 65 degrees or less.

In some embodiments, a thickness of the first protruding part 124 may be about 0.03 mm or more. For example, in the first direction X, a length TH of the upper surface 124U of the first protruding part 124 may be about 0.03 mm to about 0.19 mm. When the thickness of the first protruding part 124 is about 0.03 mm or more, the first protruding part 124 may be firmly supported and thus efficiently prevent damage to each of the shields 300A and 300B to be described later.

In some embodiments, the first protruding part 124 may extend in the second direction Y. For example, the first protruding part 124 may intersect the first connection terminals 200.

In some embodiments, the first protruding part 124 may include a plurality of sub-protruding parts 124*a* through 124*c* spaced apart from each other. For example, the first protruding part 124 may include first through third sub-protruding parts 124*a* through 124*c* spaced apart from each other in the second direction Y. Although the first protruding part 124 is illustrated as including only three sub-protruding parts, this is merely an example, and the number of sub-protruding parts may vary.

In some embodiments, the sub-protruding parts 124*a* through 124*c* may have different lengths. For example, in the second direction Y, a length La of the first sub-protruding part 124*a* may be greater than a length Lb of the second sub-protruding part 124*b*. In addition, for example, in the second direction Y, the length Lb of the second sub-protruding part 124*b* may be greater than a length Lc of the third sub-protruding part 124*c*. However, this is merely an example, and the lengths of the sub-protruding parts may vary.

In some embodiments, a ratio of a length of the first protruding part 124 to a length L of the support part 120 may be about 30% or more. For example, in the second direction Y, the ratio of the sum (La+Lb+Lc) of the lengths La through Lc of the first through third sub-protruding parts 124*a* through 124*c* to the length L of the support part 120 may be about 30% or more. When the ratio of the length of the first protruding part 124 to the length L of the support part 120 is about 30% or more, the receptacle connector according to the embodiments can efficiently prevent damage to the shields 300A and 300B to be described later.

In some embodiments, the support part 120 may further include a second protruding part 126 and a third protruding part 128. The second protruding part 126 may protrude in the third direction Z from a side of the flat part 122. The third protruding part 128 may protrude in the third direction Z from the other side of the flat part 122. Each of the second protruding part 126 and the third protruding part 128 may extend in the first direction X.

The first connection terminals 200 may be arranged on the mold structure 100. For example, the first connection terminals 200 extending in the first direction X may be arranged in the second direction Y. In addition, a front end of each of the first connection terminals 200 may be disposed on the front part 110 of the mold structure 100 and exposed from the mold structure 100.

In some embodiments, the first connection terminals 200 may include upper connection terminals 200A and lower connection terminals 200B. As illustrated in FIG. 7, the upper connection terminals 200A may be exposed from an upper surface of the mold structure 100, and the lower connection terminals 200B may be exposed from a lower surface of the mold structure 100.

Each of the upper connection terminals 200A may include, for example, a first extending part 202A, a second extending part 204A, and a first mounting part 206A.

The first extending part 202A may extend in the first direction X. A part of the first extending part 202A may be disposed on the upper surface 110U of the front part 110 and exposed from the mold structure 100. The other part of the first extending part 202A may be disposed in the support part 120 and supported by the mold structure 100.

The second extending part 204A may extend in the third direction Z and may be connected to a rear end of the first extending part 202A. The second extending part 204A may be disposed in the mold structure 100 and supported by the mold structure 100. For example, the second extending part 204A may penetrate the support part 120 and the rear part 130.

The first mounting part 206A may extend from the second extending part 204A and may be exposed from the mold structure 100. For example, the first mounting part 206A may extend from a lower end of the second extending part 204A and may be disposed under the rear part 130.

The first mounting part 206A may mount a corresponding upper connection terminal 200A on the substrate on which the receptacle connector according to the embodiments is disposed. For example, the first mounting part 206A may be mounted on the substrate using a method such as soldering. Since the mold structure 100 can support the first extending part 202A and/or the second extending part 204A, the corresponding upper connection terminal 200A mounted by the first mounting part 206A can fix the mold structure 100 to the substrate on which the receptacle connector is disposed.

Each of the lower connection terminals 200B may include, for example, a third extending part 202B, a fourth extending part 204B, and a second mounting part 206B.

The third extending part 202B may extend in the first direction X. A part of the third extending part 202B may be disposed on the lower surface of the front part 110 and exposed from the mold structure 100. The other part of the third extending part 202B may be disposed in the support part 120 and supported by the mold structure 100.

The fourth extending part 204B may extend in the third direction Z and may be connected to a rear end of the third extending part 202B. The fourth extending part 204B may be disposed in the mold structure 100 and supported by the mold structure 100.

In some embodiments, a fixing member 400 may be disposed in the rear part 130 of the mold structure 100. The fixing member 400 may seal the rear part 130 to provide a waterproof function to the receptacle connector according to the embodiments, but embodiments are not limited to this case. In some embodiments, the fourth extending part 204B may penetrate the fixing member 400.

The second mounting part 206B may extend from the fourth extending part 204B and may be exposed from the mold structure 100. For example, the second mounting part 206B may extend from a lower end of the fourth extending part 204B to protrude from a lower surface of the rear part 130.

The second mounting part 206B may mount a corresponding lower connection terminal 200B on the substrate on which the receptacle connector according to the embodiments is disposed. For example, the second mounting part 206B may be mounted on the substrate using a method such as soldering. Since the mold structure 100 can support the third extending part 202B and/or the fourth extending part 204B, the corresponding lower connection terminal 200B mounted by the second mounting part 206B can fix the mold structure 100 to the substrate on which the receptacle connector is disposed.

Each of the first connection terminals 200 may be made of a conductive material. For example, the first connection terminals 200 may include a copper alloy.

The receptacle connector according to the embodiments may further include a mid-plate 250. The mid-plate 250 may be supported and fixed by the mold structure 100. For example, the mid-plate 250 may be interposed between the upper connection terminals 200A and the lower connection terminals 200B. The mid-plate 250 may be grounded to prevent electromagnetic interference (EMI) caused by high-speed signals.

The mid-plate 250 may be made of a conductive material. For example, the mid-plate 250 may include a copper alloy.

In some embodiments, the first connection terminals 200 may include signal terminals 210, power terminals 220, and ground terminals 230.

The signal terminals 210 may input and output data electrical signals. For example, when the receptacle connector according to the embodiments is coupled to a corresponding plug connector (e.g., the plug connector 500 of FIG. 10), the signal terminals 210 may be electrically connected to signal terminals of the plug connector.

The power terminals 220 may be arranged parallel to the signal terminals 210 and input and output power signals. For example, when the receptacle connector according to the embodiments is coupled to the corresponding plug connector (e.g., the plug connector 500 of FIG. 10), the power terminals 220 may be electrically connected to power terminals of the plug connector.

The ground terminals 230 may be arranged parallel to the signal terminals 210 and the power terminals 220 and prevent EMI caused by high-speed signals. For example, when the receptacle connector according to the embodiments is coupled to the corresponding plug connector (e.g., the plug connector 500 of FIG. 10), the ground terminals 230 may be electrically connected to ground terminals of the plug connector and thus grounded.

In some embodiments, the first connection terminals 200 may be arranged in a form that satisfies a universal serial bus (USB) type-C pin standard. Connection terminals of USB type-C are not limited to a particular connection direction of the plug connector. Thus, the plug connector can be easily attached to or detached from the connection terminals.

For example, the first connection terminals 200 may be arranged as illustrated in FIGS. 8 and 9. FIG. 8 is an example pin map of the first connection terminals 200 when the receptacle connector according to the embodiments is implemented with 14 pins. FIG. 9 is an example pin map of the first connection terminals 200 when the receptacle connector according to the embodiments is implemented with 24 pins.

In FIGS. 8 and 9, GND indicates ground terminals. For example, GND may correspond to the ground terminals 230 of the first connection terminals 200. In FIGS. 8 and 9, $V_{BUS}$ indicates power terminals. For example, $V_{BUS}$ may correspond to the power terminals 220 of the first connection terminals 200. In FIGS. 8 and 9, CC1 and CC2 indicate configuration channel terminals for recognizing a plug connector. In FIGS. 8 and 9, D1 and D2 indicate terminals for data transmission, each forming a pair of (+) and (−) adjacent to each other. For example, D1 and D2 may correspond to the signal terminals 210 of the first connection terminals 200.

In FIG. 9, TX1, TX2, RX1 and RX2 indicate data bus terminals for high-speed signal transmission, each forming a pair of (+) and (−) adjacent to each other. In FIG. 9, SBU1 and SUB2 indicate sideband use terminals.

The shields 300A and 300B may be disposed on the support part 120 of the mold structure 100. For example, the shields 300A and 300B may extend along the surface of the flat part 122 of the support part 120. In addition, each of the shields 300A and 300B may be disposed behind the first protruding part 124 of the support part 120. That is, the first protruding part 124 of the support part 120 may be disposed in front of each of the front ends of the shields 300A and 300B. In addition, in the first direction X, at least a part of each of the front ends of the shields 300A and 300B may overlap the first protruding part 124.

In FIG. 6, the height H2 of the upper surface 124U of the first protruding part 124 from the upper surface 122U of the flat part 122 is smaller than a height of each of upper surfaces of the shields 300A and 300B. However, this is merely an example. For example, the height H2 of the upper surface 124U of the first protruding part 124 from the upper surface 122U of the flat part 122 may be equal to or greater than the height of each of the upper surfaces of the shields 300A and 300B.

In some embodiments, the shields 300A and 300B may be electromagnetic compatibility (EMC) shields. For example, the shields 300A and 300B may include a conductive material. The shields 300A and 300B may be grounded to prevent EMI caused by high-speed signals.

In some embodiments, each of the front ends of the shields 300A and 300B may be spaced apart from a rear end of the first protruding part 124. For example, the rear surface 124S2 of the first protruding part 124 may be spaced apart from each of the front ends of the shields 300A and 300B. In some embodiments, a distance DS between each of the front ends of the shields 300A and 300B and the rear surface 124S2 of the first protruding part 124 may be about 0.03 mm or more. In some embodiments, the distance DS is about 0.03 mm. As illustrated by the example of FIG. 6, each of the front ends of the shields 300A and 300B may include a bevel with an inclined surface which begins below the height H2 and extends above the height H2. In some embodiments, as shown in FIG. 6, a height of the shield 300A or 300B is higher than the height H2 of the protruding part above the surface 122U.

In some embodiments, the shields 300A and 300B may be disposed over the support part 120 and the rear part 130. For example, as illustrated in FIGS. 1, 5 and 7, each of the shields 300A and 300B may include a first horizontal part 310, a bent part 320, and a second horizontal part 330.

The first horizontal part 310 of each of the shields 300A and 300B may extend along a surface of the support part 120 (or the flat part 122). The bent part 320 of each of the shields 300A and 300B may be bent from the first horizontal part 310 and extend along a front surface of the rear part 130. For example, the bent part 320 may extend in the third direction Z from a rear end of the first horizontal part 310. The second horizontal part 330 of each of the shields 300A and 300B may be bent from the bent part 320 and extend along a surface of the rear part 130. For example, the second horizontal part 330 may extend in the first direction X from an upper end of the bent part 320.

In some embodiments, each of the shields 300A and 30B may further include first elastic parts 322. The first elastic parts 322 of each of the shields 300A and 300B may be bent from the first horizontal part 310 and may be disposed on the rear part 130. An end of each of the first elastic parts 322 may be fixed to the first horizontal part 310 such that the first elastic parts 322 can be elastically deformed. In some embodiments, the first elastic parts 322 may be disposed in grooves 135 of the rear part 130 and elastically deformed.

In some embodiments, an uppermost part of each of the first elastic parts 322 may protrude further an upper surface of the second horizontal part 330. For example, as illustrated in FIG. 7, the uppermost part of each of the first elastic parts 322 may be higher than the upper surface of the second horizontal part 330.

In some embodiments, at least a part of each of the shields 300A and 300B may extend alongside surfaces of the support part 120. For example, each of the shields 300A and 300B may further include a first fixing part 312 and a second fixing part 314.

The first fixing part 312 of each of the shields 300A and 300B may extend along a side surface of the support part 120, and the second fixing part 314 of each of the shields 300A and 300B may extend along the other side surface of the support part 120. For example, the first fixing part 312 may be bent from a side surface of the first horizontal part 310 and extend along a side surface of the support part 120. The second fixing part 314 may be bent from the other side surface of the first horizontal part 310 and extend along the other side surface of the support part 120.

In some embodiments, the first fixing part 312 and the second fixing part 314 may extend along a region of the support part 120 in which the first protruding part 124, the second protruding part 126, and the third protruding part 128 are not formed. For example, as illustrated in FIG. 4, the first fixing part 312 may extend along the surface of the flat part 122 disposed between the first protruding part 124 and the second protruding part 126. Likewise, the second fixing part 312 may extend along the surface of the flat part 122 disposed between the first protruding part 124 and the third protruding part 128.

In some embodiments, the first fixing part 312 and the second fixing part 314 may not overlap in the second direction Y. For example, the first fixing part 312 may be adjacent to a front end of the first horizontal part 310, and the second fixing part 314 may be adjacent to the rear end of the first horizontal part 310.

In some embodiments, the first fixing part 312 and the second fixing part 314 may be coupled to the mid-plate 250. For example, as illustrated in FIGS. 2 and 4, the mid-plate 250 may include locking parts 252 protruding from the side surfaces of the support part 120. In addition, each of the first fixing part 312 and the second fixing part 314 may include a second opening 312O. When each of the shields 300A and 300B is placed on the support part 120, the locking parts 252 of the mid-plate 250 may be coupled to the second openings 312O of the first fixing part 312 and the second fixing part 314. Accordingly, the shields 300A and 300B may be fixed on the support part 120.

In some embodiments, the shields 300A and 300B may include an upper shield 300A disposed on the upper surface of the support part 120 and a lower shield 300B disposed on the lower surface of the support part 120. The upper shield 300A and the lower shield 300 may have substantially the same shape. As used herein, the term "same" is intended to encompass not only exactly the same but also a minute difference caused by a process margin or the like. The upper shield 300A and the lower shield 300B may, for example, be disposed to face each other and surround the support part 120.

Figure 10:
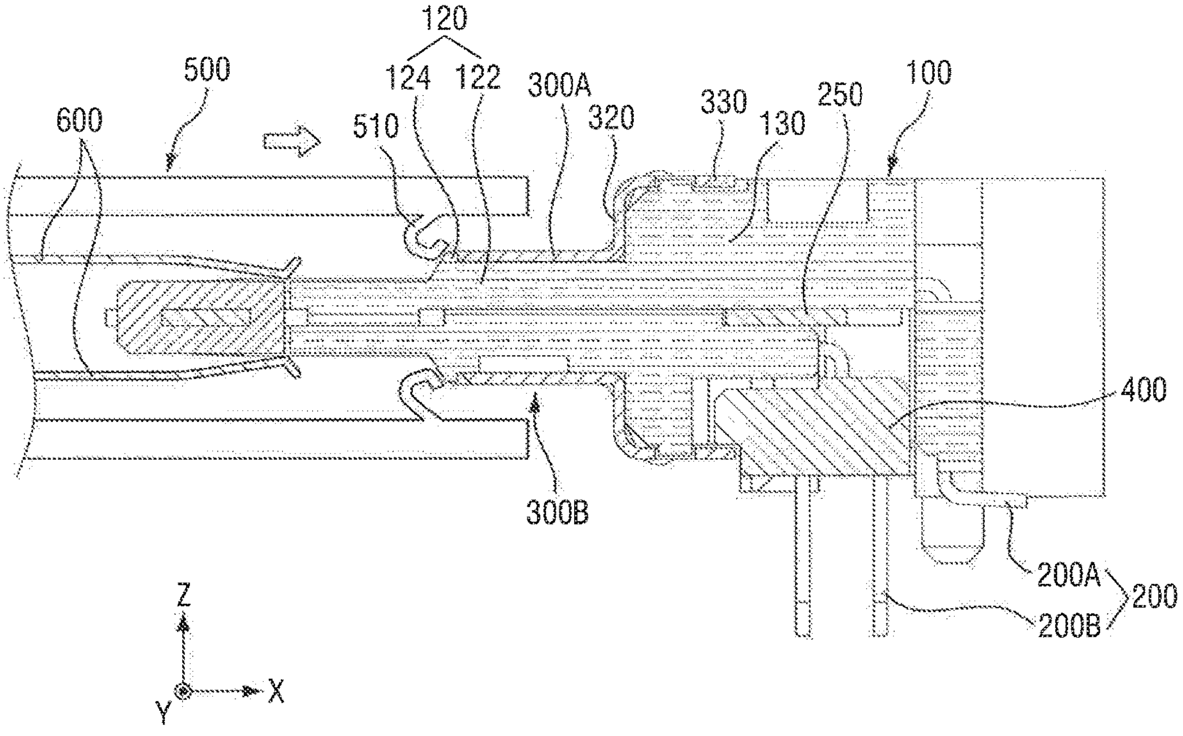
FIG. 10 is a cross-sectional view illustrating a process in which the receptacle connector according to the embodiments is coupled to a corresponding plug connector.

FIG. 10 is a cross-sectional view illustrating a process in which the receptacle connector according to the embodiments is coupled to a corresponding plug connector. For ease of description, a description of elements and features described above using FIGS. 1 through 9 will be given briefly or omitted.

Referring to FIG. 10, the receptacle connector according to the embodiments is coupled to a corresponding plug connector 500.

In some embodiments, the plug connector 500 may include second connection terminals 600 and ground pads 510.

When the receptacle connector according to the embodiments is coupled to the plug connector 500, the first connection terminals 200 may be connected to the second connection terminals 600 of the plug connector 500. The first connection terminals 200 may be electrically connected to the second connection terminals 600 to input and output electrical signals to or from the substrate (not illustrated) on which the receptacle connector according to the embodiments is mounted.

When the receptacle connector according to the embodiments is coupled to the plug connector 500, the ground pads 510 may be connected to the shields 300A and 300B. For example, the ground pads 510 may include ground springs protruding toward the inside of the ground pads 510. The shields 300A and 300B may be electrically connected to the ground springs and thus grounded.

In order to prevent EMI caused by high-speed signals, a receptacle connector may include EMC shields disposed on surfaces of a mold structure. However, as receptacle connectors become smaller in size, EMC shields are easily broken in a process in which the receptacle connectors are coupled to plug connectors. For example, front ends of EMC shields of a receptacle connector may be buckled and damaged by ground springs or ground pads of a plug connector which are connected to the EMC shields.

Addressing this problem, as described above with respect to, for example, FIGS. 4-7 and 10, the receptacle connector according to the embodiments may include the first protruding part 124 disposed in front of each of the shields 300A and 300B. Accordingly, when the receptacle connector according to the embodiments is coupled to the plug connector 500, the first protruding part 124 may protect each of the front ends of the shields 300A and 300B from the ground pads 510 of the plug connector 500, thereby preventing each of the front ends of the shields 300A and 300*b* from being damaged.

In addition, as described in the above embodiments, the front surface (e.g., 124S1 of FIG. 6) of the first protruding part 124 may have an inclination angle (e.g., θ in FIG. 6). Accordingly, when the receptacle connector according to the embodiments is coupled to the plug connector 500, the first protruding part 124 may guide each of the ground pads 510 of the plug connector 500, thereby efficiently preventing the ground pads 510 of the plug connector 500 from being damaged.

Figure 11:
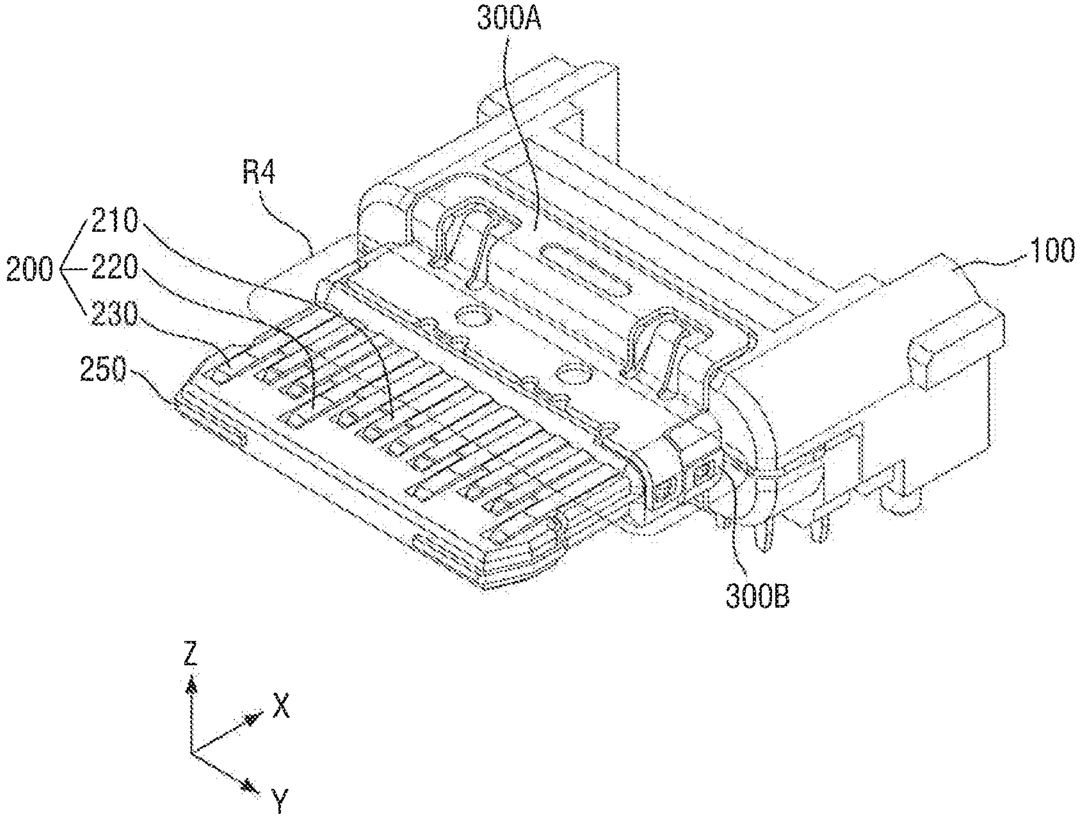
FIG. 11 is a perspective view of a receptacle connector according to embodiments.
Figure 12:
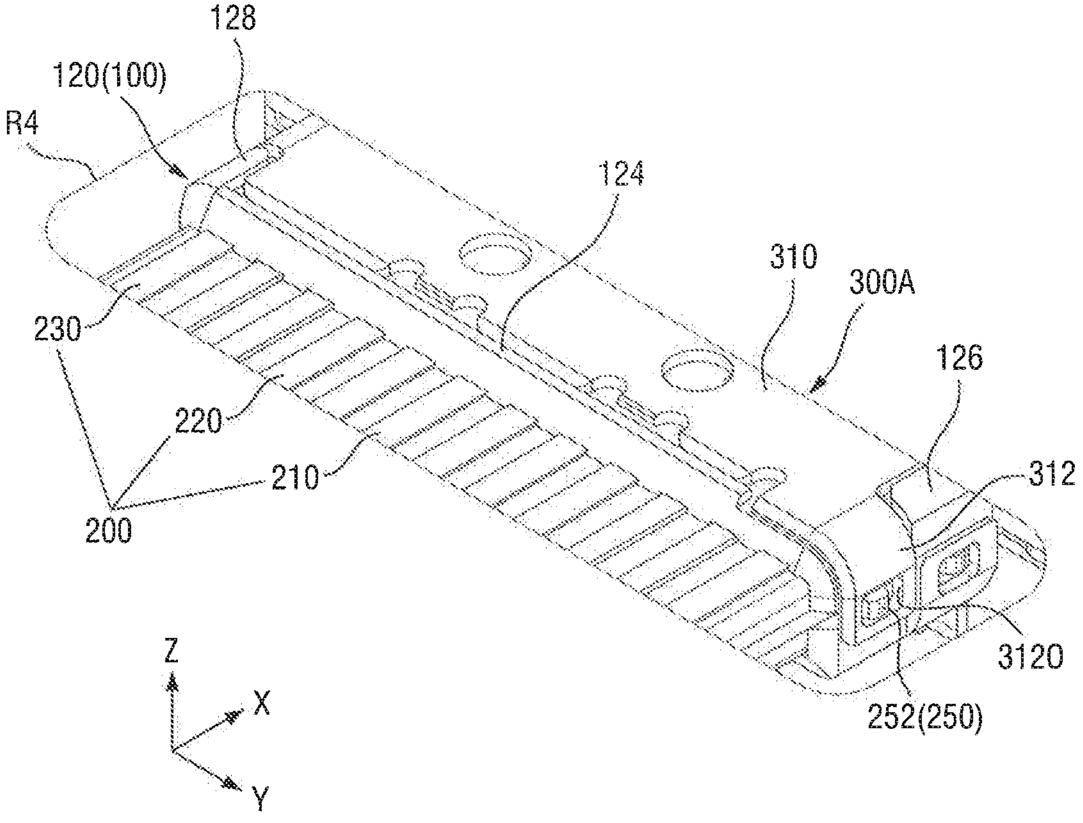
FIG. 12 is an enlarged view of region R4 of FIG. 11.

FIG. 11 is a perspective view of a receptacle connector according to embodiments. FIG. 12 is an enlarged view of region R4 of FIG. 11. For ease of description, a description of elements and features described above using FIGS. 1 through 10 will be given briefly or omitted.

Referring to FIGS. 11 and 12, in the receptacle connector according to the embodiments, a first protruding part 124 covers the entire front end of a first horizontal part 310.

For example, the first protruding part 124 may protrude in the third direction Z from a part of a flat part 122 adjacent to a front part 110 and extend in the second direction Y. In some embodiments, the first protruding part 124 may not be divided into a plurality of sub-protruding parts (e.g., 124*a* through 124*c* of FIG. 2).

The first protruding part 124 covering the entire front end of the first horizontal part 310 may more securely protect each of shields 300A and 300B.

Figure 13:
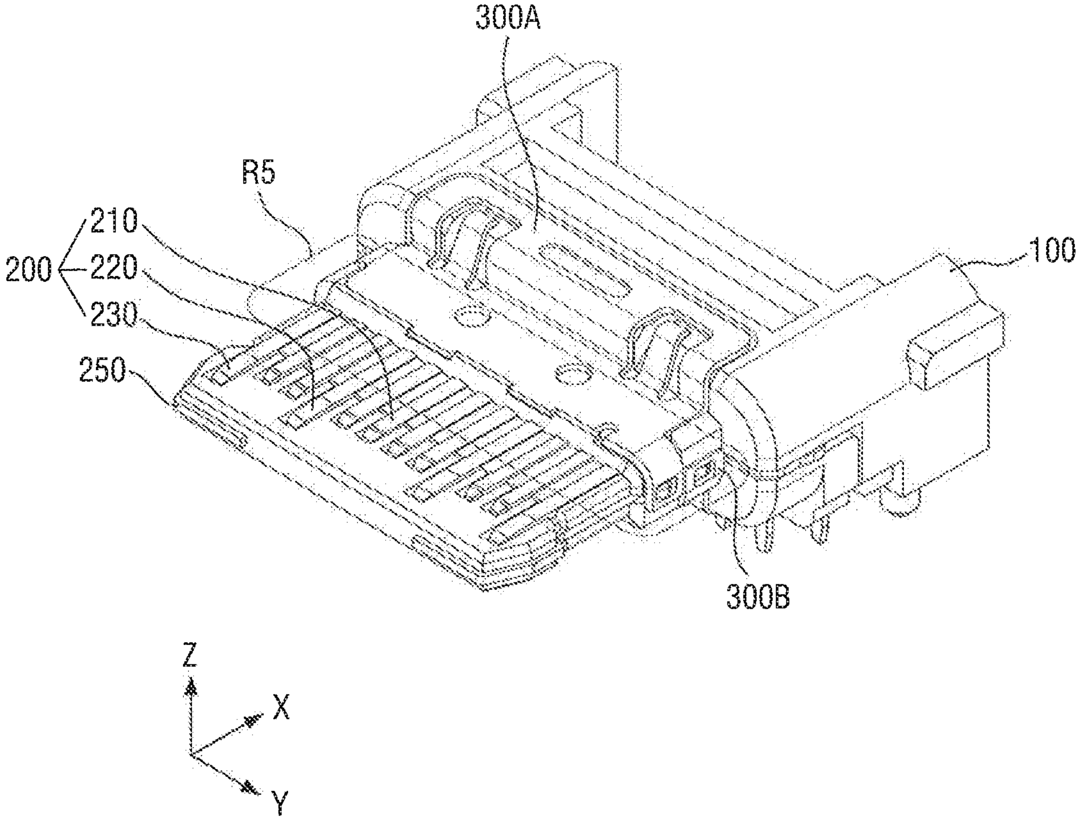
FIG. 13 is a perspective view of a receptacle connector according to embodiments.
Figure 14:
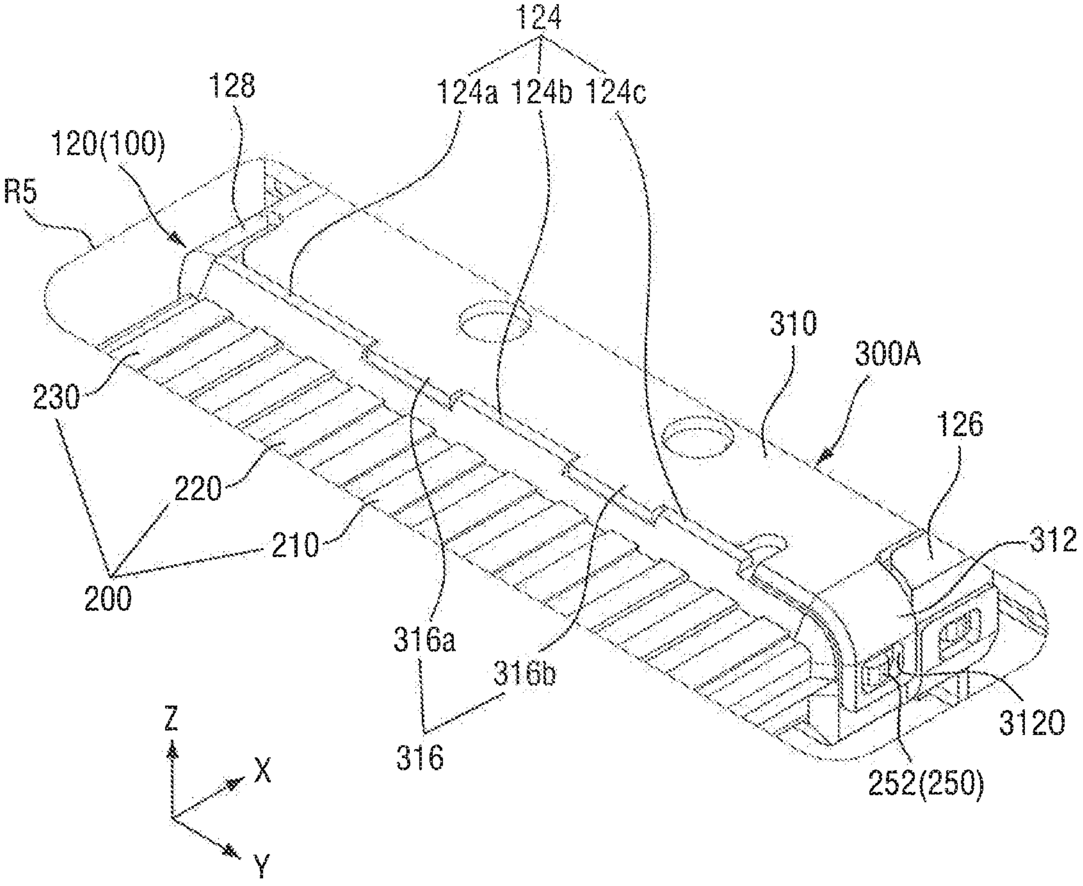
FIG. 14 is an enlarged view of region R5 of FIG. 13.

FIG. 13 is a perspective view of a receptacle connector according to embodiments. FIG. 14 is an enlarged view of region R5 of FIG. 13. For ease of description, a description of elements and features described above using FIGS. 1 through 10 will be given briefly or omitted.

Referring to FIGS. 13 and 14, in the receptacle connector according to the embodiments, each of shields 300A and 300B further includes a third protruding part 316.

The third protruding part 316 may protrude forward from a front end of a first horizontal part 310. In some embodiments, the third protruding part 316 may overlap a first protruding part 124 in the second direction Y.

In some embodiments, the third protruding part 316 may be interposed between a plurality of sub-protruding parts 124*a* through 124*c*. For example, the third protruding part 316 may include fourth and fifth sub-protruding parts 316*a* and 316*b* spaced apart from each other in the second direction Y. Here, the fourth sub-protruding part 316*a* may be interposed between a first sub-protruding part 124*a* and a second sub-protruding part 124*b*, and the fifth sub-protruding part 316*b* may be interposed between the second sub-protruding part 124*b* and a third sub-protruding part 124*c*. The fourth and fifth sub-protruding parts 316*a* and 316*b* may overlap the first through third sub-protruding parts 124*a* through 124*c* in the second direction Y.

The third protruding part 316 overlapping the first protruding part 124 in the second direction Y may enable a support part 120 to be more firmly fixed on each of the shields 300A and 300B. In addition, the third protruding part 316 may secure an additional area for an EMC function, thereby more efficiently preventing EMI caused by high-speed signals.

Figure 15:
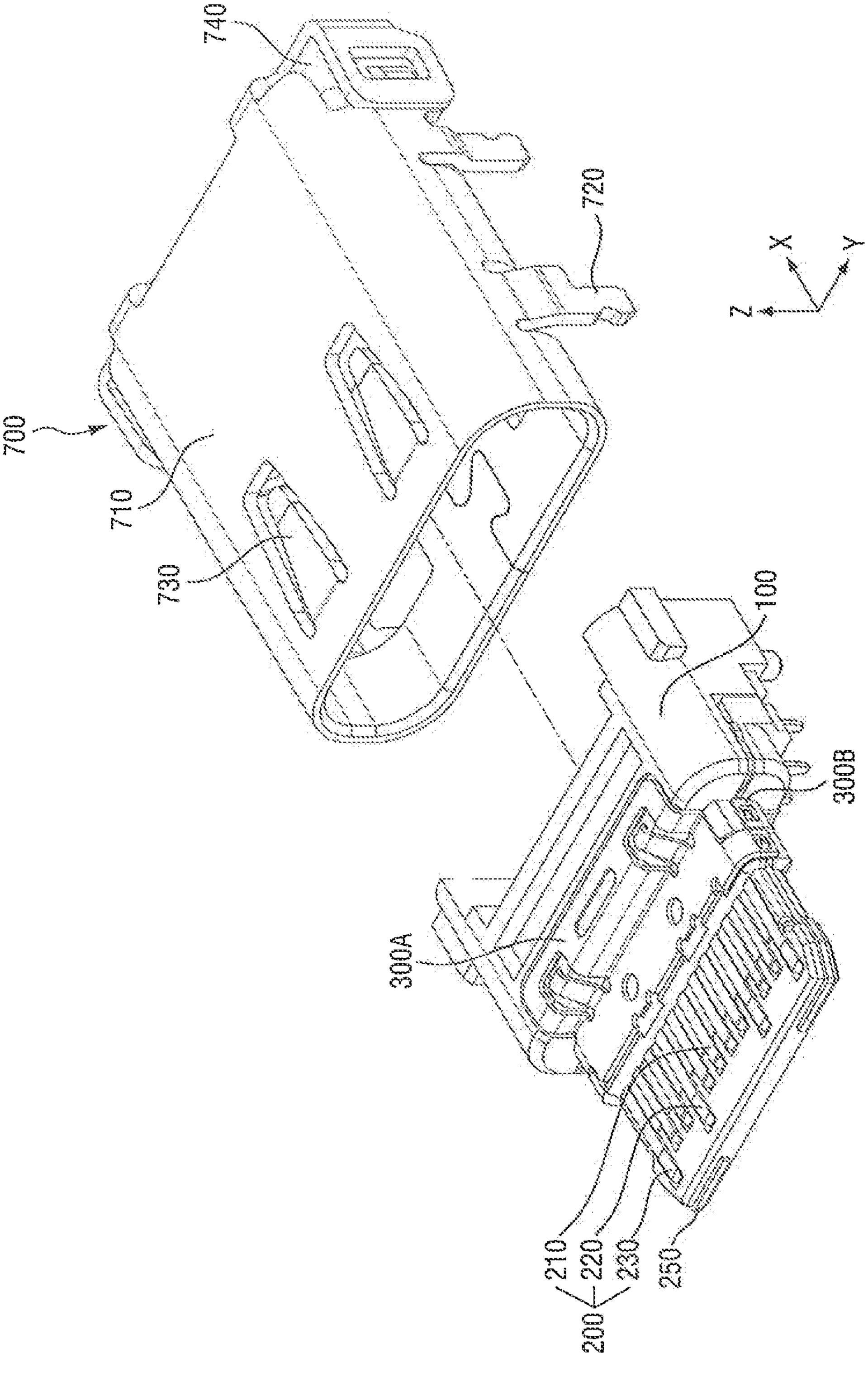
FIG. 15 is a partial exploded perspective view of a receptacle connector according to embodiments.
Figure 16:
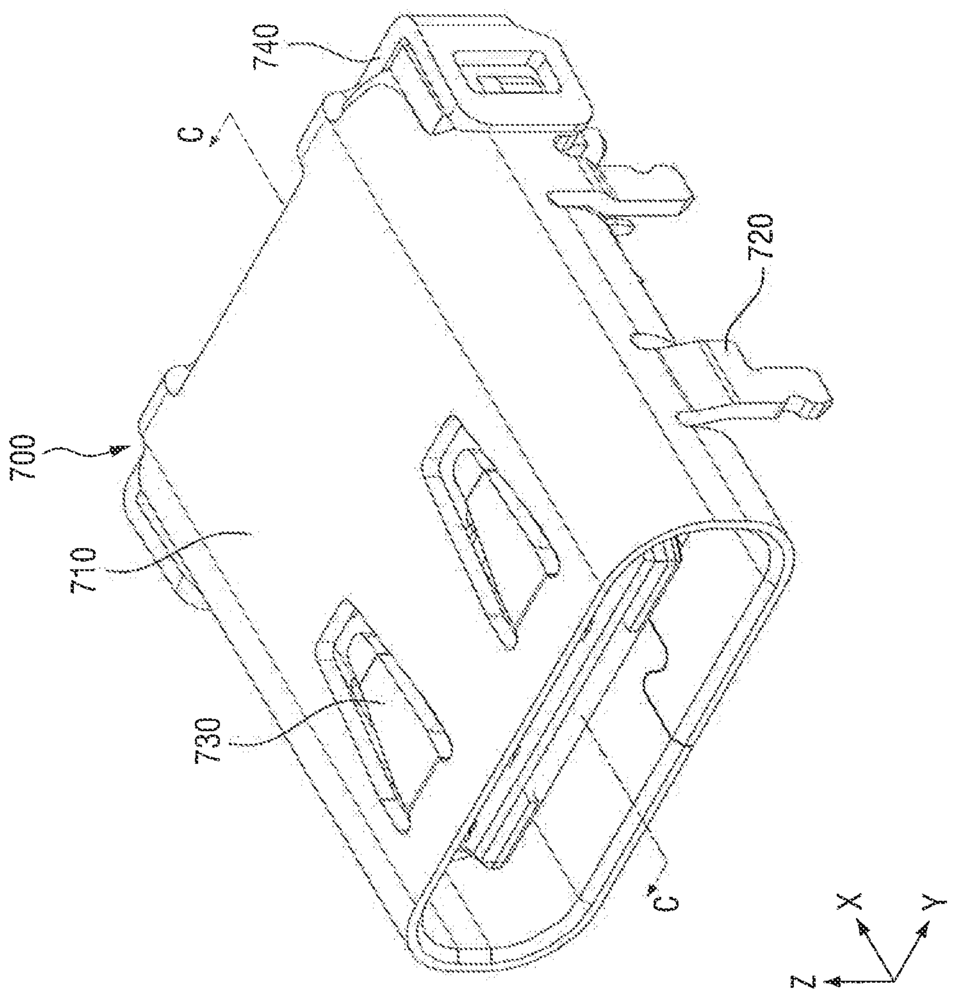
FIG. 16 is a perspective view of the receptacle connector according to the embodiments.
Figure 17:
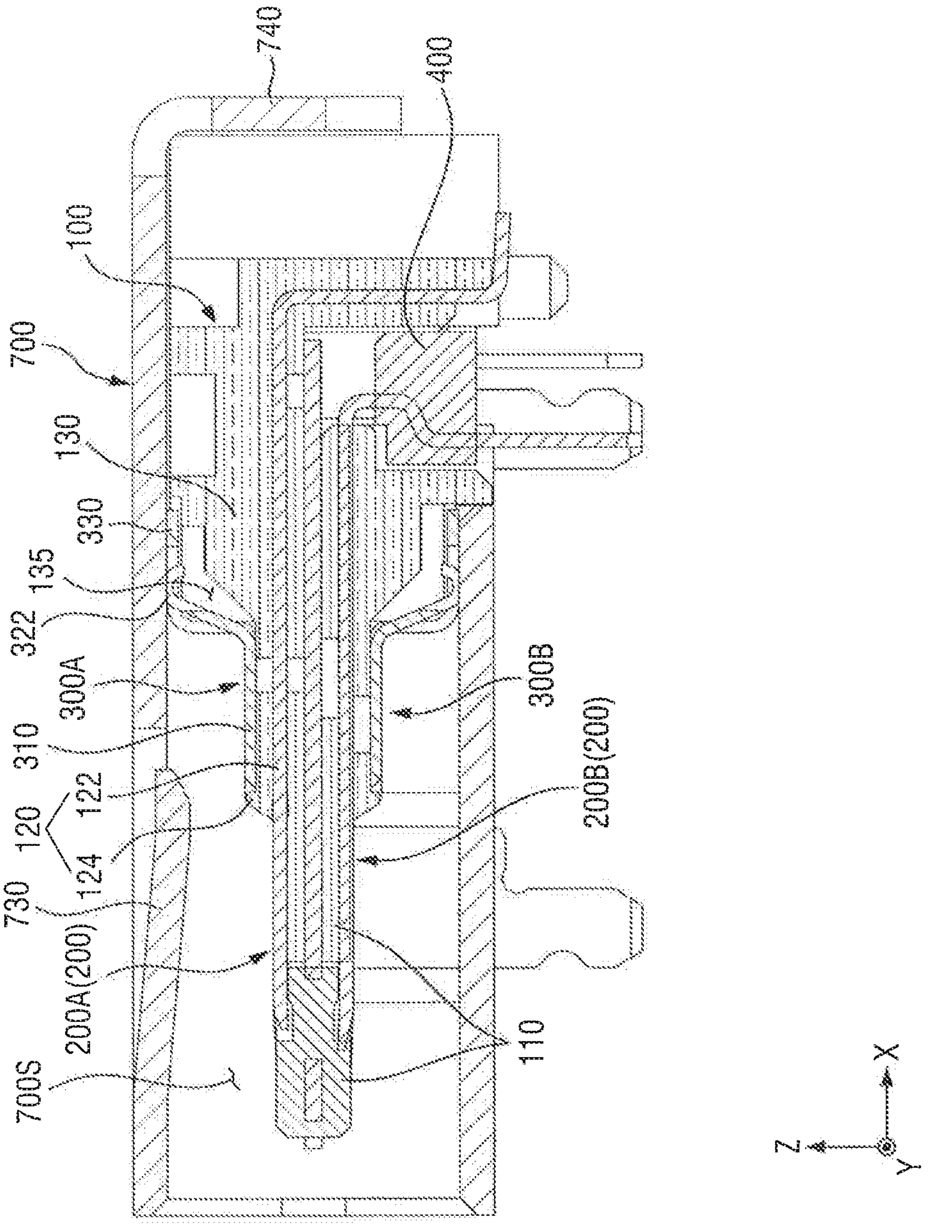
FIG. 17 is a cross-sectional view taken along line C-C of FIG. 16.

FIG. 15 is a partial exploded perspective view of a receptacle connector according to embodiments. FIG. 16 is a perspective view of the receptacle connector according to the embodiments. FIG. 17 is a cross-sectional view taken along line C-C of FIG. 16. For ease of description, a description of elements and features described above using FIGS. 1 through 10 will be given briefly or omitted.

Referring to FIGS. 15 through 17, the receptacle connector according to the embodiments further includes a housing 700.

The housing 700 may surround a mold structure 100. The housing 700 may protect the mold structure 100 from outside the receptacle connector according to the embodiments. When the receptacle connector according to the embodiments is coupled to a corresponding plug connector (e.g., the plug connector 500 of FIG. 18), the housing 700 may define a space for accommodating the plug connector. For example, as illustrated in FIG. 17, a housing space 700S may be formed between a front part 110 of the mold structure 100 and the housing 700.

The housing 700 may include a body 710. The body 710 of the housing 700 may be ring-shaped. Alternatively, the body 710 of the housing 700 may be shaped like a hollow container. For example, the body 710 may be shaped like an oval container. However, the body 710 can have various shapes surrounding the mold structure 100.

A front end of the body 710 may be open to receive a plug connector. For example, when the receptacle connector according to the embodiments is coupled to a corresponding plug connector (e.g., the plug connector 500 of FIG. 18), the plug connector may be inserted into the front end of the body 710 and disposed in the housing space 700S between the front part 110 and the body 710.

A rear end of the body 710 may be fixed by the mold structure 100. For example, the rear end of the body 710 may be supported by a rear part 130 of the mold structure 100.

In some embodiments, the housing 700 may be connected to shields 300A and 300B. For example, as illustrated in FIG. 17, the body 710 of the housing 700 may be connected to a first elastic part 322 of each of the shields 300A and 300B and/or a second horizontal part 330 of each of the shields 300A and 300B.

In some embodiments, the housing 700 may further include third mounting parts 720. The third mounting parts 720 may mount the housing 700 on a substrate or the like on which the receptacle connector according to the embodiments is disposed. For example, the third mounting parts 720 may be mounted on the substrate or the like using a method such as soldering.

In some embodiments, the housing 700 may further include second elastic parts 730. The second elastic parts 730 may be bent from the body 710 and face the housing space 700S. An end of each of the second elastic parts 730 may be fixed to the body 710 such that the second elastic part 730 can be elastically deformed.

In some embodiments, the housing 700 may further include a cover 740. The cover 740 may cover a rear end of the mold structure 100. For example, the mold structure 100 may be inserted into the rear end of the body 710, and the cover 740 may be bent to cover the rear end of the mold structure 100 as illustrated in the drawings.

Figure 18:
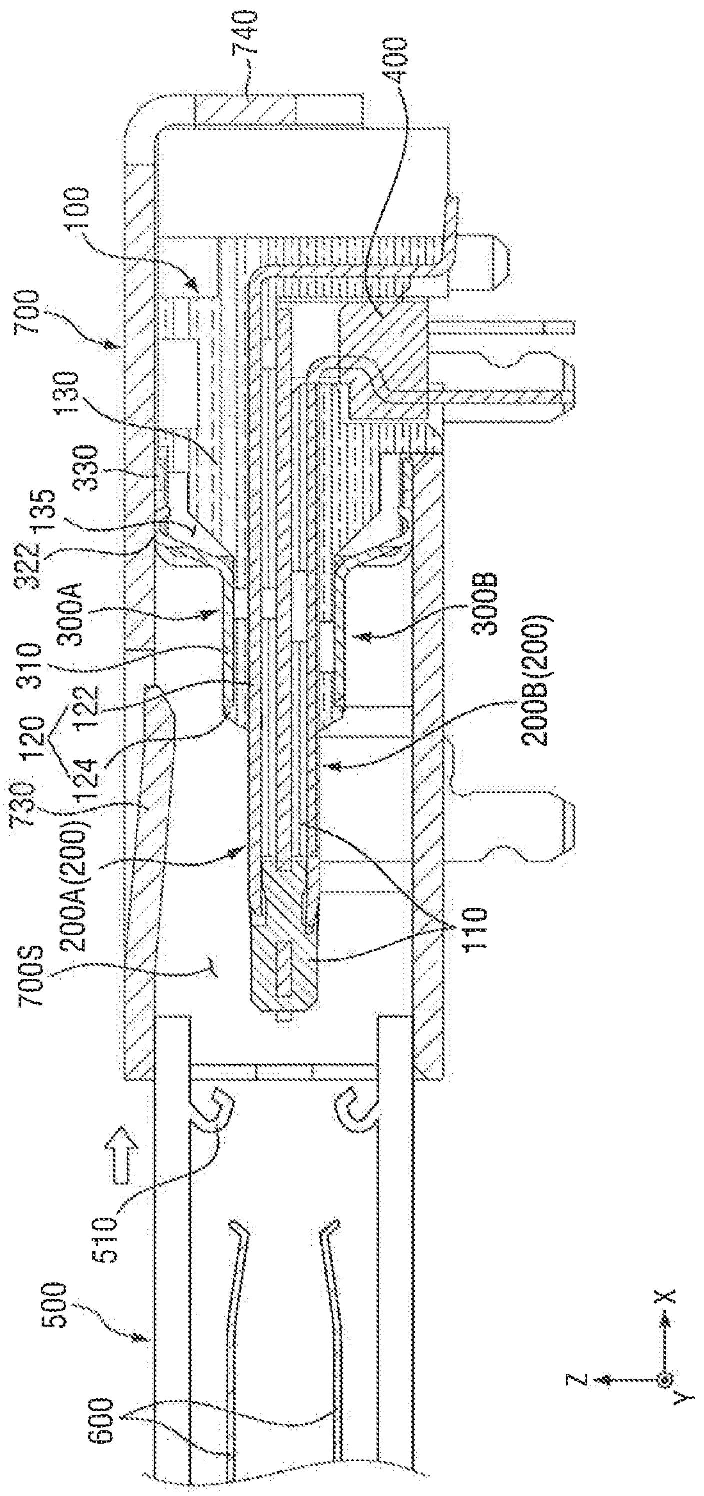
FIG. 18 is a cross-sectional view illustrating a process in which the receptacle connector according to the embodiments of FIGS. 15 through 17 is coupled to a corresponding plug connector.

FIG. 18 is a cross-sectional view illustrating a process in which the receptacle connector according to the embodiments of FIGS. 15 through 17 is coupled to a corresponding plug connector. For ease of description, a description of elements and features described above using FIGS. 1 through 10 and 15 through 17 will be given briefly or omitted.

Referring to FIG. 18, the receptacle connector according to the embodiments is coupled to a corresponding plug connector 500.

The plug connector 500 may be inserted into a front end of the housing 500 and disposed in the housing space 700S.

When the receptacle connector according to the embodiments is coupled to the plug connector 500, the plug connector 500 may be connected to the housing 700. For example, ground pads 510 of the plug connector 500 may be connected to the second elastic parts 730 of the housing 700. In some embodiments, the housing 700 may be electrically connected to the ground pads 510 and thus grounded. In addition, since the housing 700 can be connected to the shields 300A and 300B, the shields 300A and 300B may be electrically connected to the ground pads 510 and thus grounded.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A connector comprising:

a plurality of connection terminals including a plurality of upper connection terminals and a plurality of lower connection terminals;

a mold structure including a first portion and a second portion that contacts one end of the first portion and at least partially covers the plurality of connection terminals; and a shield disposed on the second portion of the mold structure and including a conductive material, wherein the plurality of upper connection terminals are disposed on a first surface of the first portion of the mold structure, and the plurality of lower connection terminals are disposed on a second surface of the first portion of the mold structure, the second portion of the mold structure includes a flat part and a protruding part, the shield extends on the flat part of the second portion of the mold structure, the plurality of connection terminals are arranged according to a universal serial bus (USB) type-C pin standard, the protruding part of the second portion of the mold structure protrudes from the flat part of the second portion of the mold structure by a first height of the protruding part of 0.03 mm to 0.13 mm, and faces one end of the shield, a front end of the shield comprises a bevel with an inclined surface extending upward and away from the protruding part, and the bevel of the shield begins below the first height of the protruding part, and wherein the shield is characterized by a second height of the shield above the flat part of the second portion, and the second height of the shield is greater than the first height of the protruding part, and thereby the bevel of the shield extends above the first height of the protruding part.

2. The connector of claim 1, wherein the plurality of connection terminals include a signal terminal, a power terminal and a ground terminal.

3. The connector of claim 1, wherein the plurality of connection terminals include a first terminal and a second terminal, and a length of the first terminal is different from a length of the second terminal.

4. The connector of claim 1, wherein the protruding part of the second portion of the mold structure is spaced apart from the shield by 0.03 mm or more.

5. The connector of claim 1, wherein a thickness of the protruding part of the second portion of the mold structure in a first direction is 0.03 mm to 0.19 mm, the first direction being from the protruding part of the second portion of the mold structure to the shield.

6. The connector of claim 1, further comprising a plate disposed between the plurality of upper connection terminals and the plurality of lower connection terminals.

7. The connector of claim 1, further comprising a housing surrounding the mold structure and the shield.

8. The connector of claim 1, wherein a first surface of the protruding part of the second portion of the mold structure is inclined by 45 degrees to 65 degrees with respect to an upper surface of the flat part of the second portion of the mold structure.

9. The connector of claim 8, wherein the front surface of the first protruding part, based on the inclination angle is configured to guide ground pads of a plug connector, whereby when the connector is coupled to the plug connector, the protruding part guides ground pads of the plug connector, thereby preventing the ground pads of the plug connector from being damaged.

10. A connector comprising:

a plurality of connection terminals;

a mold structure including a first portion and a second portion that contacts one end of the first portion and at least partially covers the plurality of connection terminals; and a shield disposed on the second portion of the mold structure, wherein at least a portion of each of the plurality of connection terminals is disposed on the first portion of the mold structure, the second portion of the mold structure includes a flat part and a protruding part, the shield extends on the flat part of the second portion of the mold structure, the plurality of connection terminals are arranged according to a universal serial bus (USB) type-C pin standard, the protruding part of the second portion of the mold structure protrudes from the flat part of the second portion of the mold structure by a first height of the protruding part of 0.03 mm to 0.13 mm, and faces one end of the shield, the protruding part of the second portion of the mold structure is spaced apart from the shield by 0.03 mm or more, a front end of the shield comprises a bevel with an inclined surface extending upward and away from the protruding part, and the bevel of the shield begins below the first height of the protruding part, and wherein the shield is characterized by a second height of the shield above the flat part of the second portion, and the second height of the shield is greater than the first height of the protruding part, and thereby the bevel of the shield extends above the first height of the protruding part.

11. The connector of claim 10, wherein the plurality of connection terminals include a plurality of upper connection terminals disposed on a first surface of the first portion of the mold structure and a plurality of lower connection terminals disposed on a second surface of the first portion of the mold structure.

12. The connector of claim 10, wherein the number of the plurality of upper connection terminals is twelve.

13. The connector of claim 10, wherein the plurality of connection terminals include a first terminal and a second terminal, and a length of the first terminal is greater than a length of the second terminal.

14. The connector of claim 13, wherein the first terminal is a power terminal, and the second terminal is a signal terminal.

15. The connector of claim 13, wherein the first terminal is a ground terminal, and the second terminal is a signal terminal.

16. The connector of claim 10, wherein the mold structure includes a polymer or a plastic resin.

17. A connector comprising:

a plurality of connection terminals including a first terminal and a second terminal, a length of the first terminal being greater than a length of the second terminal;

a mold structure including a first portion and a second portion that contacts one end of the first portion and at least partially covers the plurality of connection terminals; and a shield disposed on the second portion of the mold structure, wherein at least a portion of each of the plurality of connection terminals is disposed on the first portion of the mold structure, the second portion of the mold structure includes a flat part and a protruding part, the shield extends on the flat part of the second portion of the mold structure, the plurality of connection terminals are arranged according to a universal serial bus (USB) type-C pin standard, the protruding part of the second portion of the mold structure protrudes from the flat part of the second portion of the mold structure by a first height of the protruding part of 0.03 mm to 0.13 mm, and faces one end of the shield, a thickness of the protruding part of the second portion of the mold structure in a first direction is 0.03 mm to 0.19 mm, the first direction being from the protruding part of the second portion of the mold structure to the shield, a front end of the shield comprises a bevel with an inclined surface extending upward and away from the protruding part, and the bevel of the shield begins below the first height of the protruding part, and wherein the shield is characterized by a second height of the shield above the flat part of the second portion, and the second height of the shield is greater than the first height of the protruding part, and thereby the bevel of the shield extends above the first height of the protruding part.

18. The connector of claim 17, wherein a first surface of the protruding part of the second portion of the mold structure is inclined by 45 degrees to 65 degrees with respect to an upper surface of the flat part of the second portion of the mold structure.

19. The connector of claim 17, wherein the first terminal is a ground terminal or a power terminal, and the second terminal is a signal terminal.

20. The connector of claim 17, wherein the mold structure includes a polymer or a plastic resin, and the shield includes a conductive material.

21. The connector of claim 17, further comprising:

a plate disposed between the plurality of upper connection terminals and the plurality of lower connection terminals; and a housing surrounding the mold structure and the shield.

* * * * *